(12) United States Patent
Tomita et al.

(10) Patent No.: US 11,588,313 B2
(45) Date of Patent: Feb. 21, 2023

(54) ELECTRICAL JUNCTION BOX

(71) Applicant: Yazaki Corporation, Tokyo (JP)

(72) Inventors: Kei Tomita, Makinohara (JP); Yukihiro Koyama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/494,041

(22) Filed: Oct. 5, 2021

(65) Prior Publication Data

US 2022/0115855 A1 Apr. 14, 2022

(30) Foreign Application Priority Data

Oct. 12, 2020 (JP) .............................. JP2020-172007

(51) Int. Cl.
*H02G 5/00* (2006.01)
*H02G 3/08* (2006.01)

(52) U.S. Cl.
CPC ................. *H02G 5/00* (2013.01); *H02G 3/08* (2013.01)

(58) Field of Classification Search
CPC ....................................................... H02G 3/16
See application file for complete search history.

(56) References Cited

U.S. PATENT DOCUMENTS

| 7,766,673 B1 * | 8/2010 | Dumont ............. H01R 13/5045 439/907 |
| 2013/0034974 A1 | 2/2013 | Akahori et al. |
| 2016/0156162 A1 * | 6/2016 | Yamaguchi .............. H05K 7/02 361/624 |

FOREIGN PATENT DOCUMENTS

| JP | H09308047 A | * | 5/1996 |
| JP | 2013-34340 A | | 2/2013 |
| JP | 2013055722 A | * | 3/2013 |
| JP | 2013-150517 A | | 8/2013 |
| JP | 2013-255347 A | | 12/2013 |

* cited by examiner

*Primary Examiner* — Krystal Robinson
(74) *Attorney, Agent, or Firm* — Sughrue Mion, PLLC

(57) ABSTRACT

There is provided an electrical junction box including: a bolt holding portion that includes a stud bolt and a bolt holding portion body configured to hold the stud bolt; a first holding portion that includes a first busbar provided with a first connection terminal and a first holding portion body configured to hold the first busbar and a first electronic component; and a second holding portion that includes a second busbar provided with a second connection terminal and a second holding portion body configured to hold the second busbar and a second electronic component. The bolt holding portion, the first holding portion, and the second holding portion are assembled with a nut in a connection state in that the stud bolt is passed through the first connection terminal and the second connection terminal, and in that the first busbar and the second busbar are overlapped with each other.

3 Claims, 8 Drawing Sheets

ELECTRICAL JUNCTION BOX

CROSS-REFERENCE TO RELATED APPLICATIONS

This application is based on and claims priority under 35 USC 119 from Japanese Patent Application No. 2020-172007 filed on Oct. 12, 2020, the contents of which are incorporated herein by reference.

TECHNICAL FIELD

The present disclosure relates to an electrical junction box.

BACKGROUND ART

The electrical junction box described above includes an FL holder that holds a fuse that is an electronic component, and a case that accommodates the FL holder. Further, in order to supply power to the FL holder, a bolt block provided with a stud bolt is detachably provided on the FL holder. In addition, the FL holder may be fastened to the stud bolt by a nut through a busbar held by the FL holder and a terminal provided at an end portion of an electric wire connected to a power supply (JP2013-150517A and JP2013-255347A).

In addition, a plurality of FL holders provided separately from each other may be housed in a case. In order to supply power to the electronic components held by the respective holders, it is considered to connect the FL holders by electric wires (JP2013-034340A).

However, in JP2013-034340A described above, there is a problem that a space is increased because the number of electric wires is increased as the number of FL holders to be connected is increased, or a connector to be connected to the electric wires is required to be provided in the FL holder.

SUMMARY OF INVENTION

The present disclosure provides a space-saving electrical junction box.

According to an illustrative aspect of the present disclosure, an electrical junction box includes: a bolt holding portion that includes a stud bolt and a bolt holding portion body configured to hold the stud bolt; a first holding portion that includes a first busbar provided with a first connection terminal passing through the stud bolt, a first electronic component connected to the first busbar, and a first holding portion body configured to hold the first busbar and the first electronic component; and a second holding portion that includes a second busbar provided with a second connection terminal passing through the stud bolt, a second electronic component connected to the second busbar, and a second holding portion body configured to hold the second busbar and the second electronic component. The electrical junction box has a connection state in that the stud bolt is passed through the first connection terminal of the first busbar and the second connection terminal of the second busbar, and in that the first busbar and the second busbar are overlapped with each other, and the bolt holding portion, the first holding portion, and the second holding portion are assembled in the connection state by fastening a nut to the stud bolt.

The present disclosure has been briefly described above. Further, details of the present disclosure will be clarified by reading a mode (hereinafter, referred to as an "embodiment") for carrying out the disclosure to be described below with reference to the accompanying drawings.

BRIEF DESCRIPTION OF DRAWINGS

FIG. 3 is an exploded perspective view of the bolt block illustrated in FIG. 2.

DESCRIPTION OF EMBODIMENTS

A specific embodiment according to the present disclosure will be described below with reference to the drawings.

Figure 1:
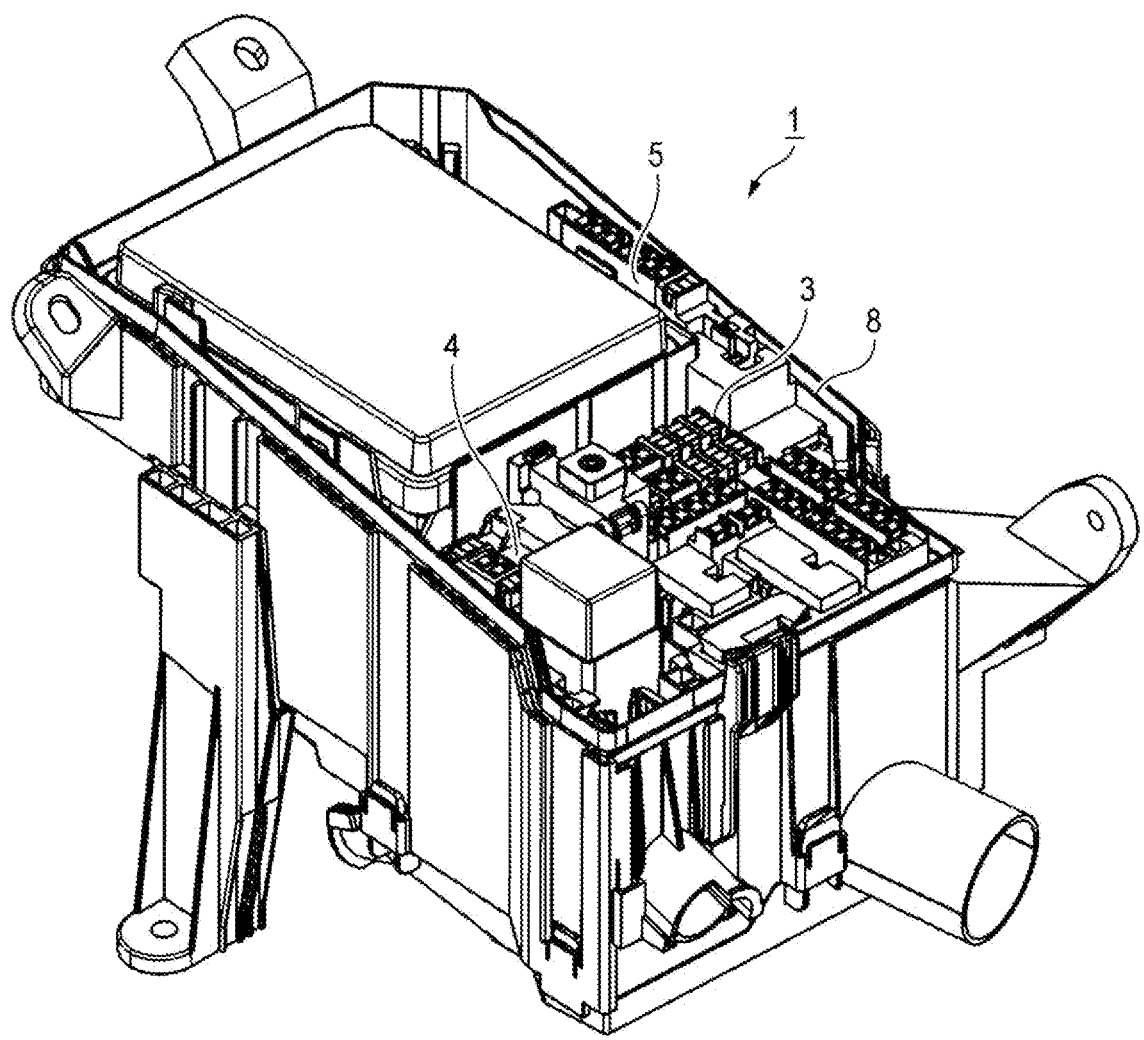
FIG. 1 is a perspective view illustrating an embodiment of an electrical junction box of the present disclosure.
Figure 1:
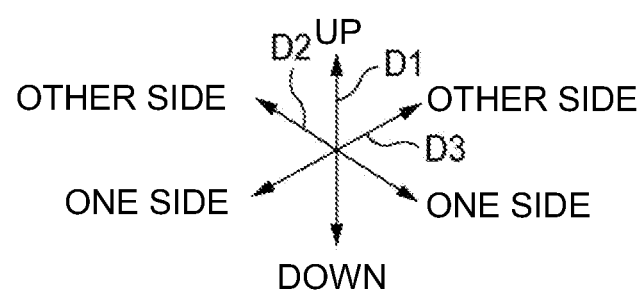
Figure 2:
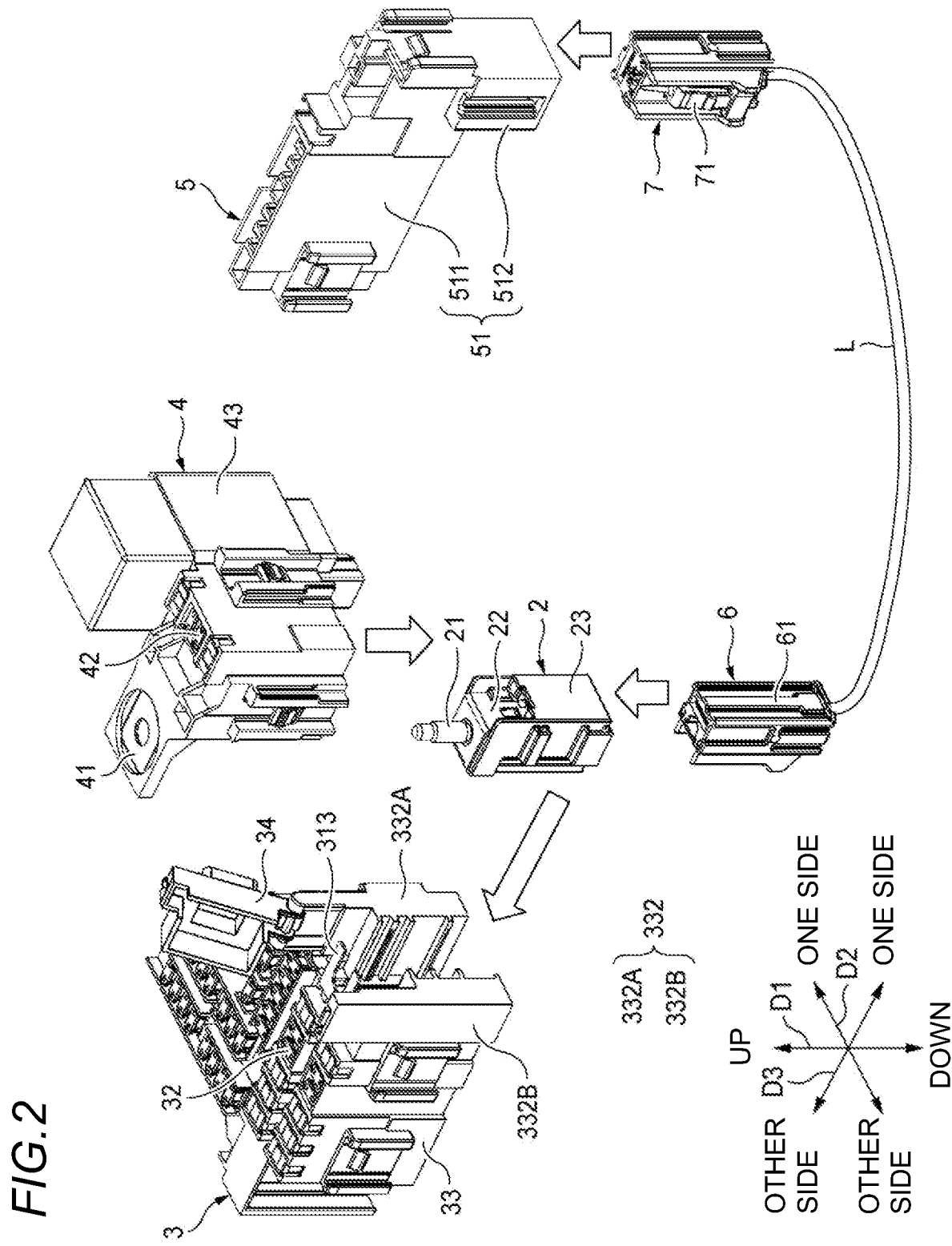
FIG. 2 is an exploded perspective view of a bolt block, an FL holder, and a connector constituting the electrical junction box illustrated in FIG. 1.

FIG. 1 is a perspective view illustrating an embodiment of an electrical junction box of the present disclosure. In FIG. 1, an upper cover constituting a case is omitted. FIG. 2 is an exploded perspective view of a bolt block, an FL holder, and a connector constituting the electrical junction box illustrated in FIG. 1.

An electrical junction box of the present embodiment is typically mounted on a vehicle and houses electronic components such as a relay and a fuse.

As illustrated in FIGS. 1 and 2, an electrical junction box 1 includes a bolt block 2 (as illustrated in FIG. 2) that holds the stud bolt 21, a type-A FL holder 3 and a type-B FL holder 4 that are assembled to the bolt block 2, a type-C FL holder 5, a first connector 6 and a second connector 7 (as illustrated in FIG. 2) that electrically connect the bolt block 2 to the type-C FL holder 5, and a case 8 that accommodates these components.

Figure 3:
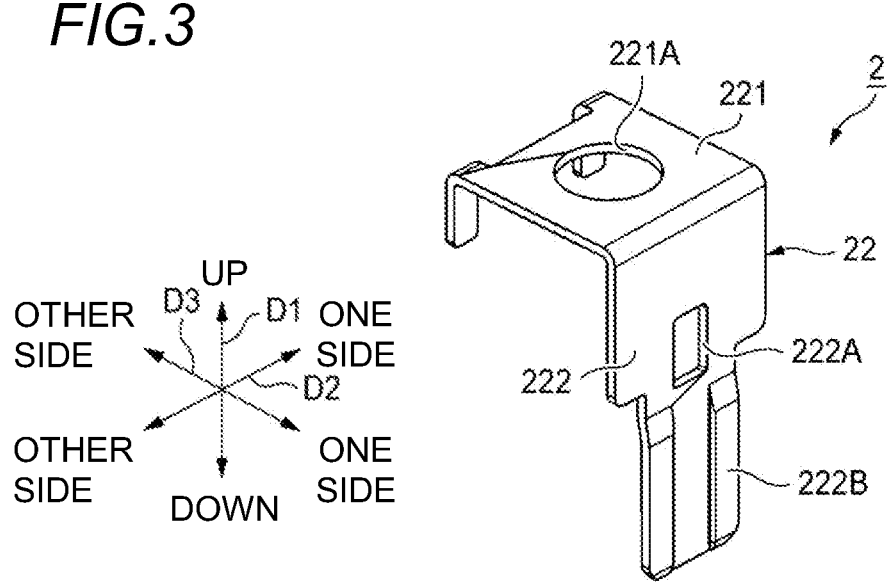
FIG. 3 is an exploded perspective view of the bolt block
Figure 3:
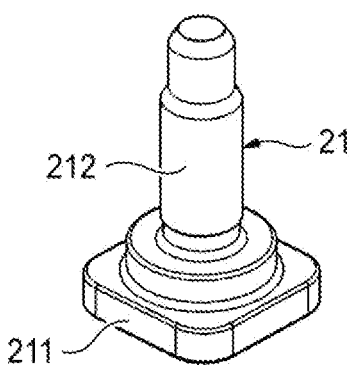
Figure 3:
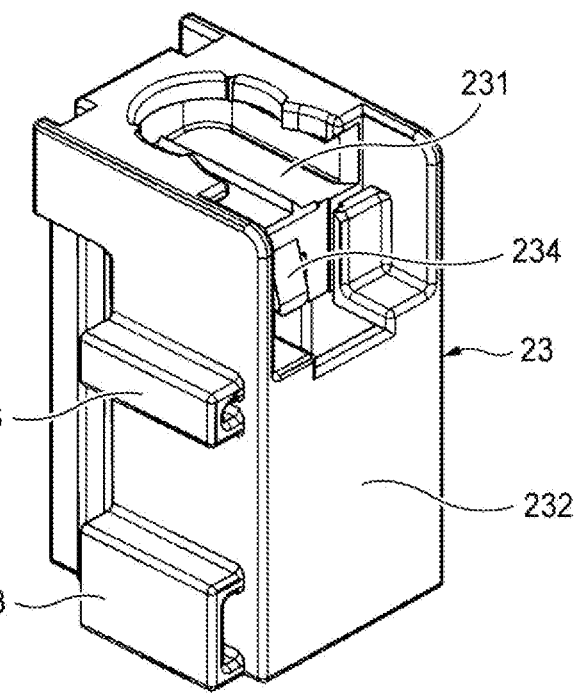

As illustrated in FIG. 3 the bolt block 2 (i.e., bolt holding portion) includes the stud bolt 21, a busbar 22 that is electrically connected to the stud bolt 21, a block 23 (i.e., a bolt holding portion body) made of resin that holds the stud bolt 21 and the busbar 22, and a bolt connector 24 that is connected to the stud bolt 21.

Hereinafter, for convenience of explanation, an "up-down direction D1", a "longitudinal direction D2", and a "lateral direction D3" are defined as illustrated in FIG. 1 or the like. The "up-down direction D1", the "longitudinal direction D2", and the "lateral direction D3" are orthogonal to one another. When the electrical junction box 1 is mounted on a vehicle, the "up-down direction D1" corresponds to an up-down direction of the vehicle. The case 8 is provided in a substantially rectangular shape when viewed from above. The "longitudinal direction D2" corresponds to a longitudinal direction of the rectangular case 8. The "lateral direction D3" corresponds to the lateral direction of the rectangular case 8.

The stud bolt 21 includes a flat plate-shaped head portion 211 and a cylindrical shaft portion 212 protruding upward in the up-down direction D1 from the head portion 211. The busbar 22 is formed of a metal plate bent in a substantially L-shape. The busbar 22 includes a bolt connection portion 221 provided perpendicularly to the up-down direction D1, and a terminal portion 222 extending downward in the up-down direction D1 from an end portion of the bolt connection portion 221 on one side in the lateral direction D3.

A circular through hole 221A through which the shaft portion 212 of the stud bolt 21 is inserted is formed in the bolt connection portion 221. The bolt connection portion 221 is superposed on an upper side of the head portion 211 in the up-down direction D1 in a state where the shaft portion 212 passes through the through hole 221A. The terminal portion 222 constitutes the bolt connector 24 to be described later. In the terminal portion 222, a rectangular locking hole 222A to be locked to the block 23 is provided on the bolt connection portion 221 side, and a tab-shaped terminal 222B is provided at a lower end.

Figure 4:
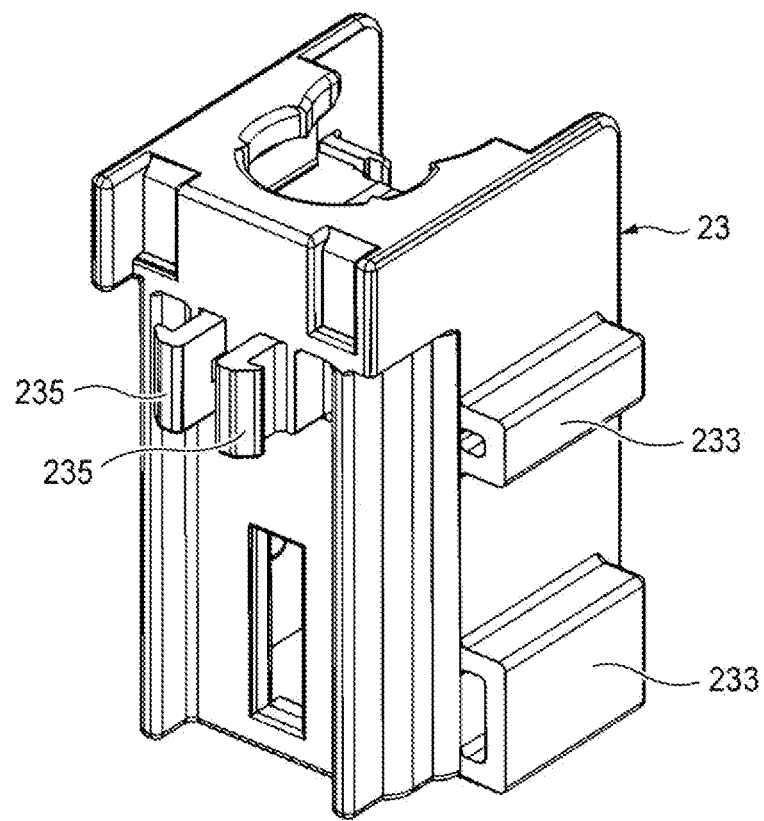
FIG. 4 is a perspective view of a block constituting the bolt block illustrated in FIG. 3.
Figure 4:
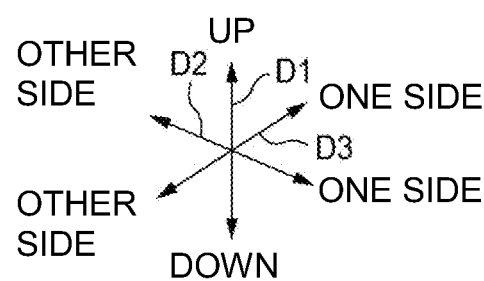

The block 23 is provided in a substantially square tubular shape and includes a stud bolt mounting portion 231 that closes the other side in the lateral direction D3 of an upper opening of the substantially square tube, a connector housing 232 that is provided below the stud bolt mounting portion 231, a plurality of slide ribs 233, a locking protrusion 234 that locks the busbar 22, and a pair of locking arms 235, 235 (as illustrated in FIG. 4) that are to be locked to a type-A FL holder 3.

The head portion 211 of the stud bolt 21 and the bolt connection portion 221 of the busbar 22 are mounted on an upper face of the stud bolt mounting portion 231. In addition, the locking protrusion 234, which is to be locked to the locking hole 222A provided in the above-described busbar 22, is provided on an end surface of the stud bolt mounting portion 231 on one side in the lateral direction D3. The terminal portion 222 is inserted into the connector housing 232 from the upper opening that is not closed by the stud bolt mounting portion 231. The connector housing 232 and the terminal portion 222 constitute the bolt connector 24.

Further, the slide ribs 233 are respectively provided on outer side faces on both sides of the block 23 in the longitudinal direction D2, and extend in the lateral direction D3. As illustrated in FIG. 4, the pair of locking arms 235 protrude from an outer side face on the other side of the block 23 in the lateral direction D3 and are provided side by side in the longitudinal direction D2. The pair of locking arms 235 are locked to the type-A FL holder 3 when the pair of locking arms 235 are slidably inserted into the type-A FL holder 3, which will be described later, toward the other side in the lateral direction D3.

Figure 5:
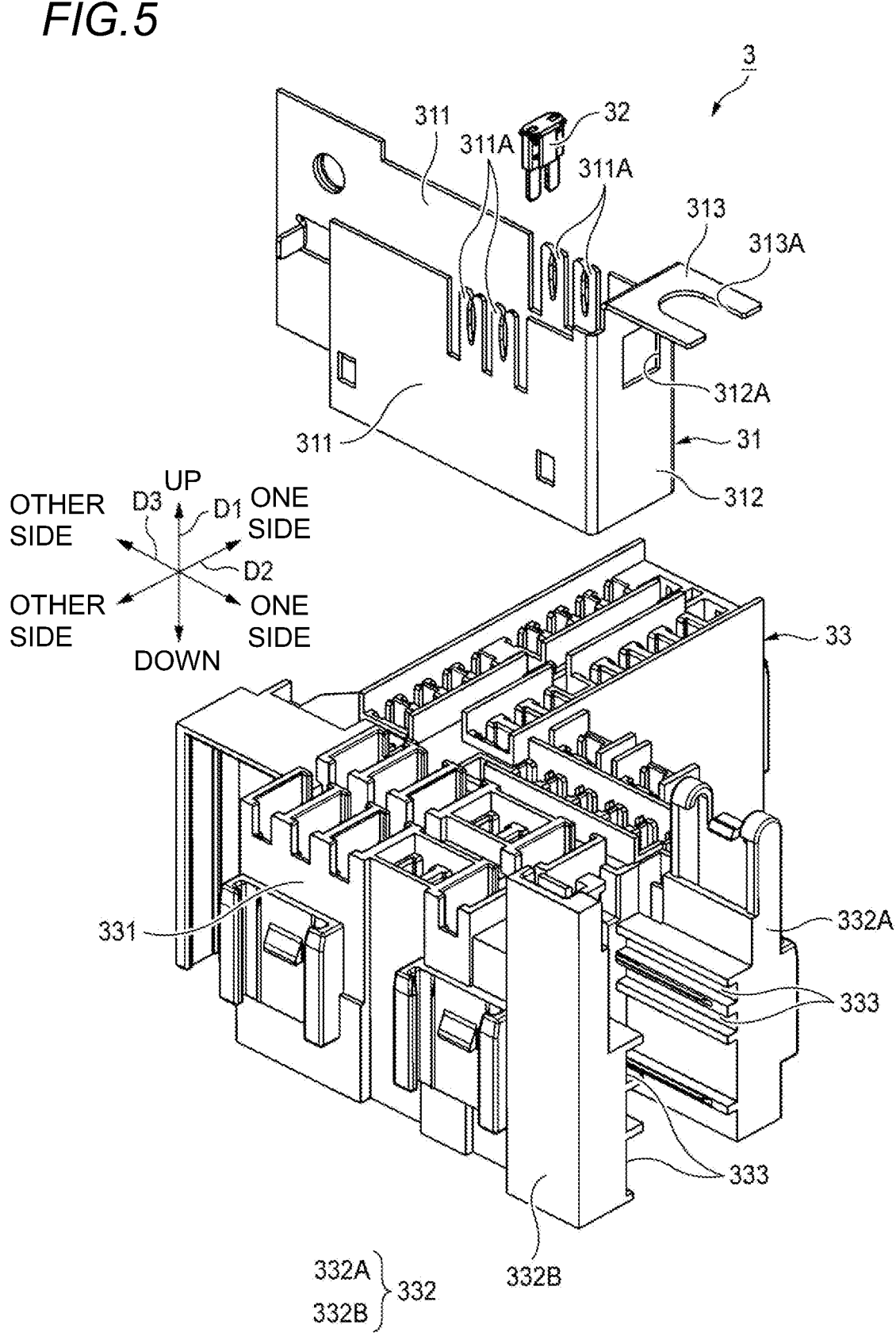
FIG. 5 is an exploded perspective view of a type-A FL holder illustrated in FIG. 2.

Next, the type-A FL holder 3 (i.e., first holding portion) will be described. As illustrated in FIG. 5 and the like, the type-A FL holder 3 includes a first busbar 31 provided with a through hole 313A through which the shaft portion 212 of the stud bolt 21 is inserted, a plurality of fuses (i.e., first electronic components) 32, a block 33 (i.e., a first holding portion body) made of resin that holds the first busbar 31 and the fuses 32, and a stud bolt cover 34 (as illustrated in FIG. 2).

The first busbar 31 is formed of a metal plate subjected to punching and pressing. The first busbar 31 includes a pair of plate-shaped portions 311 that are orthogonal to the longitudinal direction D2 and are separated from each other in the longitudinal direction D2, a coupling portion 312 that couples end portions of the pair of plate-shaped portions 311 on one side in the lateral direction D3 to each other, and a bolt connection portion 313 that is bent from an upper end of the coupling portion 312 toward the one side in the lateral direction D3. A plurality of terminals 311A to be connected to the fuse 32 are provided at upper ends of the pair of plate-shaped portions 311.

The coupling portion 312 is provided perpendicularly to the lateral direction D3, and is provided with a through hole 312A through which the pair of locking arms 235 of the bolt block 2 are to be inserted. The bolt connection portion 313 is provided perpendicularly to the up-down direction D1, and a first connection terminal 313A (hereinafter, referred to as a through hole 313A) through which the stud bolt 21 is to be inserted is provided at a center of the bolt connection portion 313. In other words, the first connection terminal 313A of the bolt connection portion 313 may include an end portion on the one side in the lateral direction D3, and the first connection terminal 313A may extend to open towards the end portion. The through hole 313A extends to an end portion of the bolt connection portion 313 on one side in the lateral direction D3. The stud bolt 21 can be inserted into the through hole 313A from an opening on one end side in the lateral direction D3.

The block 33 includes a fuse mounting portion 331 which is provided on the other side in the lateral direction D3 and on which the fuse 32 is mounted, and a bolt block mounting portion 332 (i.e., slide insertion portion) which is provided on one side in the lateral direction D3 and on which the bolt block 2 is mounted. The fuse mounting portion 331 holds the plate-shaped portions 311 and the coupling portion 312 of the first busbar 31 described above. The coupling portion 312 is held outward than the outer side face of the fuse mounting portion 331 on one side in the lateral direction D3. A locking hole (not illustrated) to be locked to the pair of locking arms 235 of the bolt block 2 is provided on the outer side face on the one side of the fuse mounting portion 331 in the lateral direction D3. The through hole 312A provided in the coupling portion 312 is overlapped with the locking hole (not illustrated). The terminal 311A is exposed from an upper end of the fuse mounting portion 331. The fuse 32 is mounted by connecting the terminal of the fuse 32 to the terminal 311A. The bolt connection portion 313 protrudes from the fuse mounting portion 331 toward one side in the lateral direction D3.

The bolt block mounting portion 332 includes a pair of slide walls 332A, 332B protruding from an outer side face of the fuse mounting portion 331 on one side in the lateral direction D3. As illustrated in FIG. 2, the pair of slide walls 332A, 332B are separated from each other in the longitudinal direction D2, and the bolt connection portion 313 is positioned between the pair of slide walls 332A, 332B. Further, the bolt block 2 is slidably inserted between the pair of slide walls 332A, 332B.

A slide groove 333, which extends along the lateral direction D3 and into which the slide rib 233 of the bolt block 2 is slidably inserted, is provided on each of the inner side faces of the pair of slide walls 332A, 332B. As illustrated in FIG. 2, an end portion on one side of the stud bolt cover 34 in the longitudinal direction D2 is attached to an upper end of the slide wall 332A so as to be rotatable about an axis along the lateral direction D3. Accordingly, when an end portion on the other side of the stud bolt cover 34 in the longitudinal direction D2 is brought close to the slide wall 332B, an upper opening of the pair of slide walls 332A, 332B are closed. In addition, when the end portion on the other side of the stud bolt cover 34 in the longitudinal direction D2 is separated from the slide wall 332B, the upper side of the pair of slide walls 332A, 332B is opened.

Figure 6:
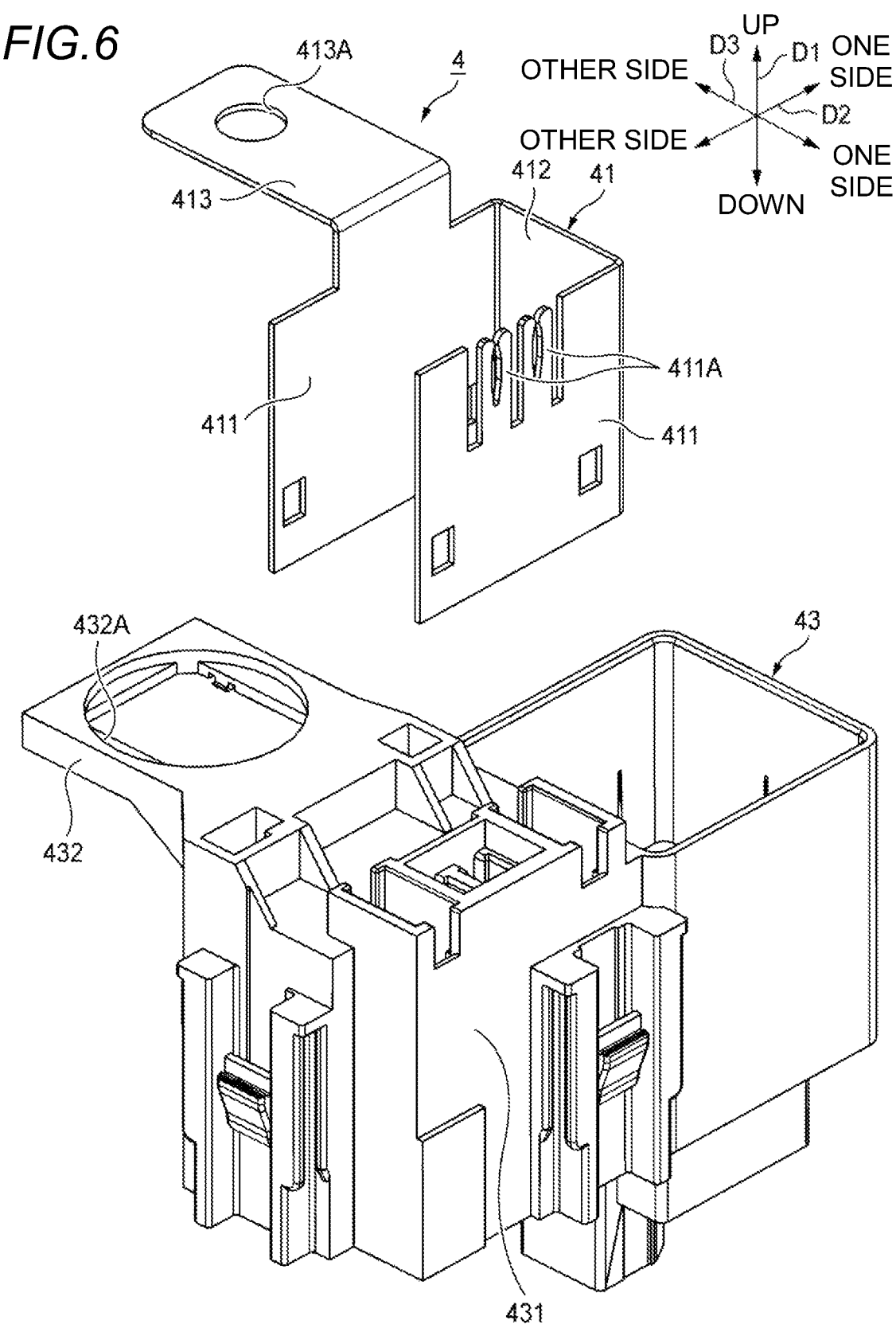
FIG. 6 is a partially exploded perspective view of a type-B FL holder illustrated in FIG. 2.

Next, a type-B FL holder 4 as a second holding portion will be described. As illustrated in FIG. 6 and the like, the type-B FL holder 4 includes a second busbar 41 provided with a second connection terminal 413A (hereinafter, referred to as a through hole 413A) through which the shaft portion 212 of the stud bolt 21 passes, a fuse 42 (as illustrated in FIG. 2) as a plurality of second electronic components, and a block 43 (i.e., a second holding portion body) made of resin that holds the second busbar 41 and the fuse 42.

The second busbar 41 is formed of a metal plate subjected to punching and pressing. The second busbar 41 includes a pair of plate-shaped portions 411, 411 that are orthogonal to the lateral direction D3 and are separated from each other in the lateral direction D3, a coupling portion 412 that couples end portions on one side of the pair of plate-shaped portions 411, 411 in the longitudinal direction D2, and a bolt connection portion 413 that is bent from an upper end of the plate-shaped portion 411 on the other side in the lateral direction D3 toward the other side in the lateral direction D3.

Terminals 411A to be connected to the fuse are provided at an upper end of the plate-shaped portion 411 on one side in the lateral direction D3. The bolt connection portion 413 is provided perpendicularly to the up-down direction D1, and a through hole 413A through which the stud bolt 21 is to be inserted is provided at a center of the bolt connection portion 413. The through hole 413A is provided in a circular shape.

The block 43 includes a fuse mounting portion 431 which is provided on one side in the lateral direction D3 and on which the fuse 42 is mounted, and a bolt holding portion 432 that is provided on the other side in the lateral direction D3 and holds the bolt connection portion 413. The fuse mounting portion 431 holds the plate-shaped portions 411, 411 and the coupling portion 412 of the second busbar 41 described above. The Terminal 411A protrudes from an upper end of the fuse mounting portion 431. The fuse 42 is mounted by connecting a terminal of the fuse 42 to the terminal 411A. The bolt holding portion 432 protrudes from an upper end of a side face on the other side of the fuse mounting portion 431 in the lateral direction D3. The bolt holding portion 432 is provided with a circular exposure hole 432A. Upper and lower portions of the periphery of the through hole 413A of the bolt connection portion 413 are exposed from the exposure hole 432A.

As illustrated in FIG. 2 and the like, the type-C FL holder 5 as a third holding portion includes a third busbar and a fuse (not illustrated), and a block 51 (i.e., a third holding portion body) made of resin that holds the busbar and the fuse.

The third busbar (not illustrated) is provided orthogonally to the longitudinal direction D2, and a terminal to be connected to the fuse is provided at an upper end on the other side in the longitudinal direction D2. The third busbar is provided with a terminal, which is to be connected with a second connector 7 to be described later, at a lower end on one side in the longitudinal direction D2. The block 51 includes a fuse mounting portion 511 which is provided on the other side in the longitudinal direction D2 and on which the fuse is mounted, and a connector housing 512 to be connector-connected to the second connector 7. The connector housing 512 is provided in a tubular shape having an opening on the lower side, and houses the terminal provided at the lower end of the third busbar therein. The connector housing 512 and the terminal provided at the lower end of the third busbar constitute a holder connector to be connector-connected to the second connector 7.

The first connector 6 includes a connector housing 61 that is to be inserted and fitted into the connector housing 232 of the bolt block 2, and a terminal (not illustrated) that is housed in the connector housing 61 and is to be electrically connected to the terminal portion 222 of the bolt block 2. One end of an electric wire L is connected to the terminal (not illustrated) of the first connector 6.

The second connector 7 includes a connector housing 71 that is to be inserted and fitted into the connector housing 512 of the type-C FL holder 5, and a terminal (not illustrated) that is housed in the connector housing 71 and is to be connected to the terminal provided at the third busbar of the type-C FL holder 5. The other end of the electric wire L is connected to the terminal (not illustrated) of the second connector 7.

Next, the assembly of the electrical junction box 1 described above will be described. The stud bolt cover 34 is opened. Next, the bolt block 2 is moved toward the other side in the lateral direction D3, and the bolt block 2 is slidably inserted between the pair of slide walls 332A, 332B of the type-A FL holder 3. At this time, the slide rib 233 of the bolt block 2 is inserted into the slide groove 333 of the type-A FL holder 3, so that the bolt block 2 is moved to the other side in the lateral direction D3 to be guided.

Figure 7:
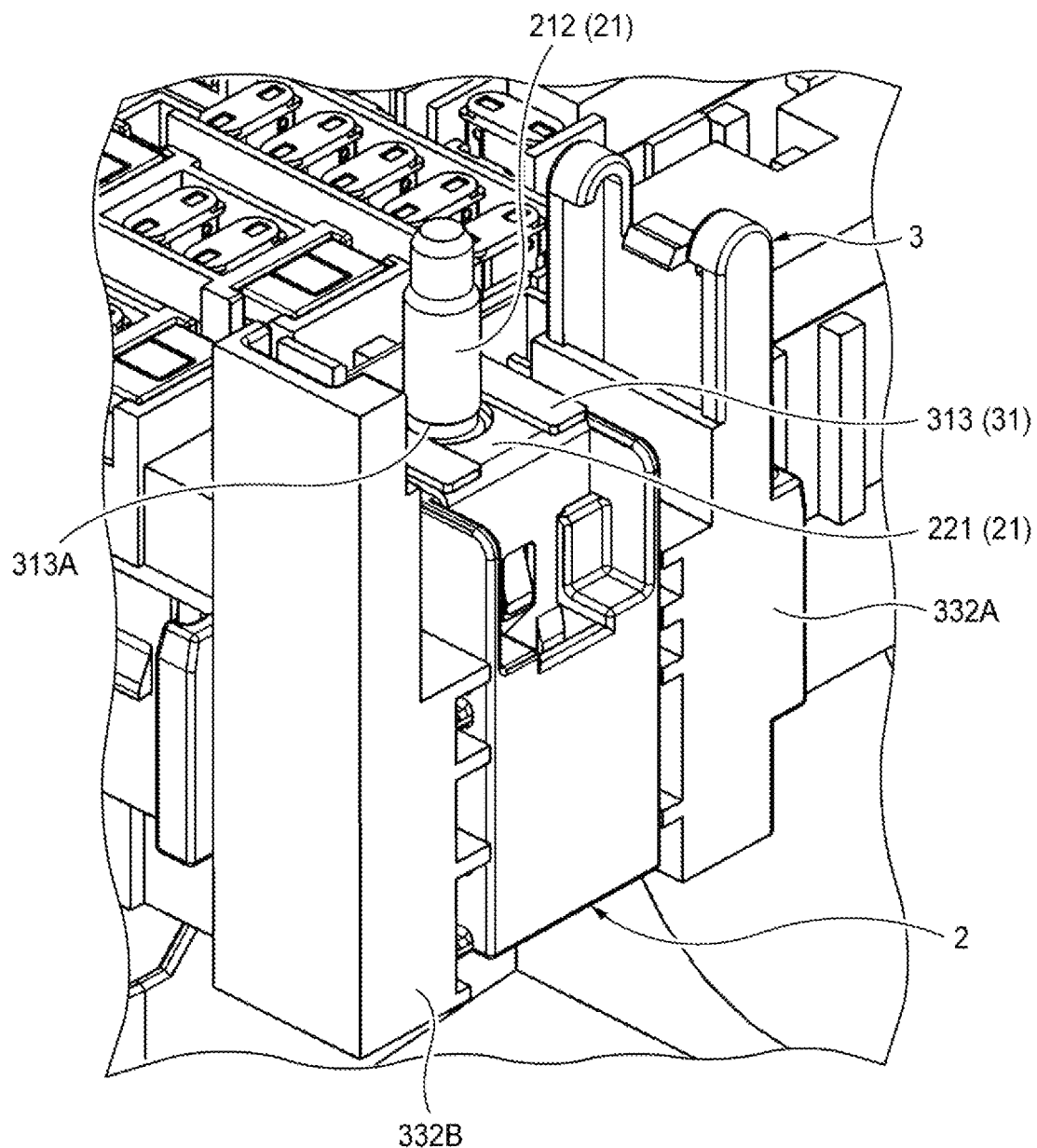
FIG. 7 is a partial perspective view illustrating a state in which the bolt block illustrated in FIG. 2 and the type-A FL holder are assembled.

At this time, as illustrated in FIG. 7, the shaft portion 212 of the stud bolt 21 is inserted from the opening of the through hole 313A of the first busbar 31 on one side in the lateral direction D3 and is passed through the through hole 313A. In addition, the bolt connection portion 313 of the first busbar 31 is overlapped with the bolt connection portion 221 provided on the busbar 22 of the bolt block 2.

When the bolt block 2 is moved toward the other side in the lateral direction D3, the pair of locking arms 235, 235 of the bolt block 2 pass through the through hole 313A provided in the first busbar 31 and are locked to the locking hole (not illustrated) provided in the stud bolt mounting portion 231.

Figure 8:
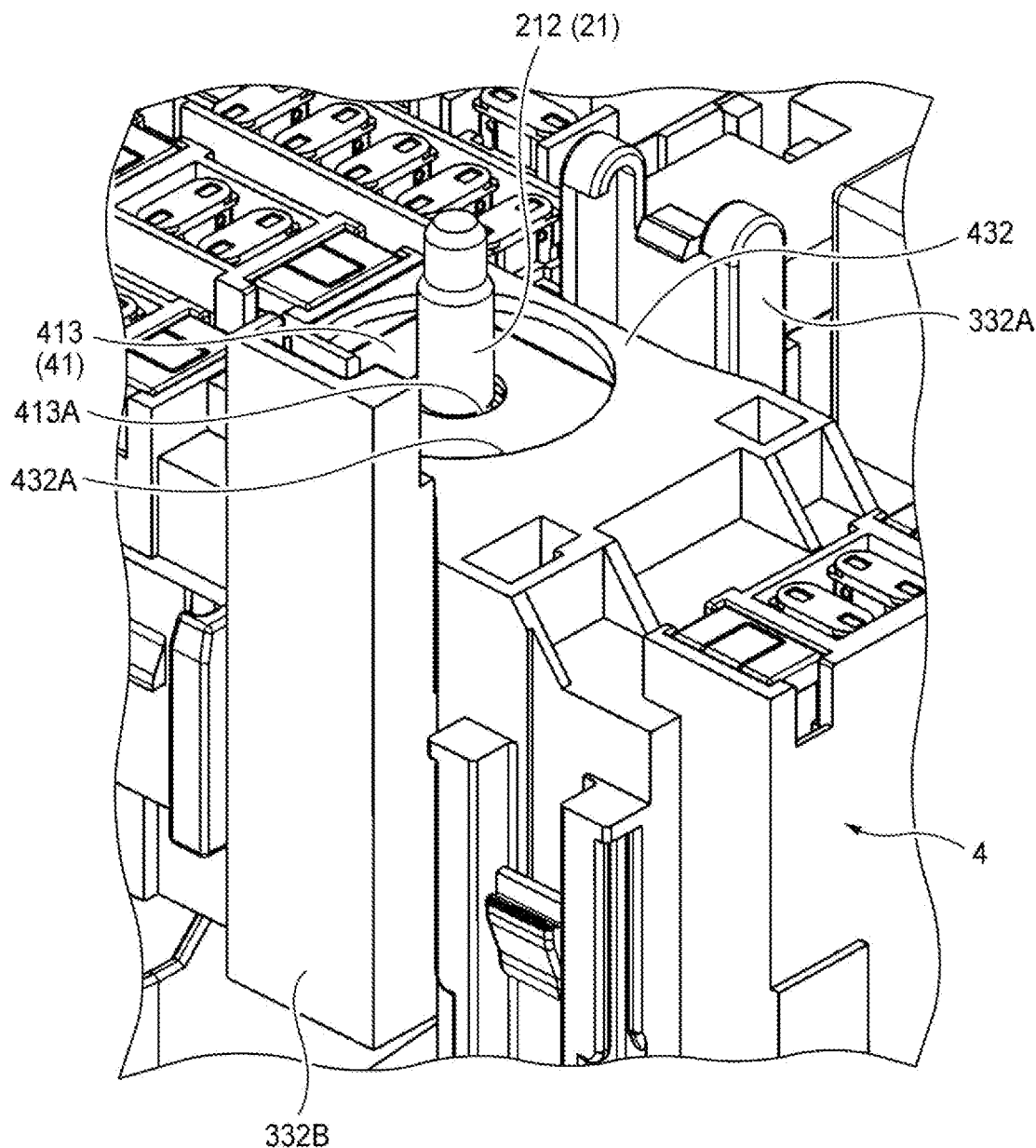
FIG. 8 is a partial perspective view illustrating a state in which the bolt block and the type-A FL holder and the type-B FL holder, which are illustrated in FIG. 2, are assembled.

Next, as illustrated in FIG. 8, the type-B FL holder 4 is moved downward in the up-down direction D1, and the shaft portion 212 of the stud bolt 21 is inserted into the through hole 413A provided in the second busbar 41 of the type-B FL holder 4. At this time, the bolt connection portion 413 of the second busbar 41 is overlapped with the bolt connection portion 313 of the first busbar 31. That is, the head portion 211 of the stud bolt 21, the bolt connection portion 221 of the busbar 22, the bolt connection portion 313 of the first busbar 31, and the bolt connection portion 413 of the second busbar 41 are overlapped in this order from the bottom.

Thereafter, a nut (not illustrated) is fastened to the shaft portion 212 of the stud bolt 21, and the type-A FL holder 3 and the type-B FL holder 4 are assembled to the stud bolt 21. Further, the stud bolt cover 34 is closed, and the upper portion of the stud bolt 21 is covered with the stud bolt cover 34.

Further, the first connector 6 is connected to the bolt connector 24 provided in the bolt block 2, and the second connector 7 is connected to the holder connector including the connector housing 512 provided in the type-C FL holder 5 and the terminal portion provided in the busbar. Thereby, the first busbar 31 of the type-A FL holder 3, the second busbar 41 of the type-B FL holder 4, and the busbar (not illustrated) of the type-C FL holder 5 are electrically connected.

According to the above-described embodiment, the bolt block 2, the type-A FL holder 3, and the type-B FL holder 4 are assembled by fastening a nut to the stud bolt 21 in a state where the first busbar 31 and the second busbar 41 are overlapped by passing the stud bolt 21 through the through hole 313A and the through hole 413A of the first busbar 31 and the second busbar 41. As a result, it is not necessary to connect the type-A FL holder 3 and the type-B FL holder 4 using electric wires, and the space-saving can be achieved.

In addition, when power supply from the type-A FL holder 3 to the type-B FL holder 4 or the type-C FL holder 5 is not necessary, the bolt block 2 can be detached from the type-A FL holder 3, and the number of components can be reduced.

According to the above-described embodiment, the bolt block 2 and the type-C FL holder 5 are connected to each other via the first connector 6 and the second connector 7. As a result, the number of FL holders to be connected using the first and second connectors 6, 7 can be further increased.

According to the embodiment described above, the type-A FL holder 3 includes the bolt block mounting portion 332 into which the bolt block 2 is slidably inserted from the other side in the lateral direction D3 (i.e., the direction intersecting the upright direction of the stud bolt 21), and the through hole 312A of the first busbar 31 extends to the end portion on one side in the lateral direction D3 (i.e., the side opposite to the slide insertion direction of the bolt block 2). As a result, even when the bolt block 2 is slidably inserted into the type-A FL holder 3, the stud bolt 21 can pass through the through hole 312A of the first busbar 31.

According to the embodiment described above, the bolt connection portion 413 provided with the through hole 413A of the second busbar 41 protrudes from the fuse mounting portion 431 toward the other side in the lateral direction D3 (i.e., slide insertion direction). Accordingly, the type-A FL holder 3, the bolt block 2, and the type-B FL holder 4 can be arranged side by side in the lateral direction D3, and the space-saving can be further achieved.

The present disclosure is not limited to the above embodiment, and modifications, improvements, and the like can be made as appropriate. In addition, materials, shapes, dimensions, numbers, arrangement positions or the like of each constituent element in the embodiment described above are optional and not limited as long as the object of the present disclosure can be achieved.

For example, the bolt block 2 may be slidably inserted into the type-A FL holder 3 toward the upper side in the up-down direction D1.

The electronic component is not limited to the fuse described above, and may be a relay or the like.

In addition, it is not essential to provide the bolt connector 24 in the bolt block 2, and the bolt connector 24 may not be provided.

According to a first illustrative aspect of the present disclosure, an electrical junction box (1) includes: a bolt holding portion (2) that includes a stud bolt (21) and a bolt holding portion body (23) configured to hold the stud bolt (21); a first holding portion (3) that includes a first busbar (31) provided with a first connection terminal (313A) passing through the stud bolt (21), a first electronic component (32) connected to the first busbar (31), and a first holding portion body (33) configured to hold the first busbar (31) and the first electronic component (32); and a second holding portion (4) that includes a second busbar (41) provided with a second connection terminal (413A) passing through the stud bolt (21), a second electronic component (42) connected to the second busbar (41), and a second holding portion body (43) configured to hold the second busbar (41) and the second electronic component (42). The electrical junction box (1) has a connection state in that the stud bolt (21) is passed through the first connection terminal (313A) of the first busbar (31) and the second connection terminal (413A) of the second busbar (41), and in that the first busbar (31) and the second busbar (41) are overlapped with each other, and the bolt holding portion (2), the first holding portion (3), and the second holding portion (4) are assembled in the connection state by fastening a nut to the stud bolt (21).

According to the above first aspect of the present disclosure, the bolt holding portion (2), the first holding portion (3), and the second holding portion (4) are assembled by fastening a nut to the stud bolt (21) in a state where the first busbar (31) and the second busbar (41) are overlapped by passing the stud bolt (21) through the first connection terminal (313A) of the first busbar (31) and the second connection terminal (413A) of the second busbar (41). As a result, it is not necessary to connect the first holding portion (3) and the second holding portion (4) using electric wires, and space-saving can be achieved.

According to a second illustrative aspect of the present disclosure, the bolt holding portion (2) includes a bolt connector (24) capable of being electrically connected to the stud bolt (21). The electrical junction box (1) further includes: a first connector (6) capable of being connected to the bolt connector (24); a second connector (7) capable of being connected to the first connector (6) via an electric wire; and a third holding portion (5) that includes a third busbar, a third electronic component capable of being connected to the third busbar, a third holding portion body (51) configured to hold the third busbar and the third electronic component, and a holder connector (512) capable of being connected to the second connector (7), the holder connector (512) being electrically connectable to the third busbar.

According to the above second aspect of the present disclosure, it is possible to further increase the number of holding portions to be connected using the first and second connectors.

According to a third illustrative aspect of the present disclosure, the first holding portion (3) includes a slide insertion portion (332) into which the bolt holding portion (2) is slidably inserted towards a slide insertion direction (D3) intersecting with an upright direction of the stud bolt (21). The first connection terminal (313A) of the first busbar (31) includes an end portion on a side opposite to the slide insertion direction (D3) in which the bolt holding portion (2) is inserted into the slide insertion portion (332), the first connection terminal (313A) extending to open towards the end portion.

According to the above third aspect of the present disclosure, even when the bolt holding portion (2) is slidably inserted into the first holding portion (3), the stud bolt (21) can pass through the first connection terminal (313A) of the first busbar (31).

According to a fourth illustrative aspect of the present disclosure, the second holding portion body (43) includes a second electronic component mounting portion (431) configured to hold the second electronic component (42). The second connection terminal (413A) of the second busbar (41) includes a portion (413) in which a through hole (413A) is provided, the portion protruding from the second electronic component mounting portion (431) towards the slide insertion direction (D3).

According to the above fourth aspect of the present disclosure, the first holding portion (3), the stud bolt (21), and the second holding portion (4) can be arranged side by side in the sliding direction, and space-saving can be further achieved.

According to the present disclosure, it is possible to provide a space-saving electrical junction box.

What is claimed is:

1. An electrical junction box comprising:
   a bolt holding portion that includes a stud bolt and a bolt holding portion body configured to hold the stud bolt;
   a first holding portion that includes a first busbar provided with a first connection terminal passing through the stud bolt, a first electronic component connected to the first busbar, and a first holding portion body configured to hold the first busbar and the first electronic component; and
   a second holding portion that includes a second busbar provided with a second connection terminal passing through the stud bolt, a second electronic component connected to the second busbar, and a second holding portion body configured to hold the second busbar and the second electronic component,
   wherein the electrical junction box has a connection state in that the stud bolt is passed through the first connection terminal of the first busbar and the second connection terminal of the second busbar, and in that the first busbar and the second busbar are overlapped with each other,
   wherein the bolt holding portion, the first holding portion, and the second holding portion are assembled in the connection state by fastening a nut to the stud bolt,
   wherein the bolt holding portion includes a bolt connector capable of being electrically connected to the stud bolt, and
   wherein the electrical junction box further comprises:
   a first connector capable of being connected to the bolt connector;
   a second connector capable of being connected to the first connector via an electric wire; and
   a third holding portion that includes a third busbar, a third electronic component capable of being connected to the third busbar, a third holding portion body configured to hold the third busbar and the third electronic component, and a holder connector capable of being connected to the second connector, the holder connector being electrically connectable to the third busbar.

2. The electrical junction box according to claim 1, wherein the first holding portion includes a slide insertion portion into which the bolt holding portion is slidably inserted towards a slide insertion direction intersecting with an upright direction of the stud bolt, and
   wherein the first connection terminal of the first busbar includes an end portion on a side opposite to the slide insertion direction in which the bolt holding portion is inserted into the slide insertion portion, the first connection terminal extending to open towards the end portion.

3. The electrical junction box according to claim 2, wherein the second holding portion body includes a second electronic component mounting portion configured to hold the second electronic component, and
   wherein the second connection terminal of the second busbar includes a portion in which a through hole is provided, protruding from the second electronic component mounting portion towards the slide insertion direction.

* * * * *